United States Patent
Lu

(10) Patent No.: US 6,189,908 B1
(45) Date of Patent: Feb. 20, 2001

(54) SHOCK-ABSORBING FRAME STRUCTURE FOR BICYCLE

(75) Inventor: Julie Lu, Miaoli Hsien (TW)

(73) Assignee: Tech Cycle Industrial Co., Ltd., Miaoli Hsien (TW)

(*) Notice: Under 35 U.S.C. 154(b), the term of this patent shall be extended for 0 days.

(21) Appl. No.: 09/506,330

(22) Filed: Feb. 18, 2000

(51) Int. Cl.[7] .................................................. B62K 1/00
(52) U.S. Cl. .................. 280/284; 280/288.1; 280/304.4; 297/215.11
(58) Field of Search .................................. 280/275, 283, 280/284, 288.1, 304.4, 288.4, 274, 281.1; 297/215.1, 215.11

(56) References Cited

U.S. PATENT DOCUMENTS

| | | | |
|---|---|---|---|
| 3,982,770 | * | 9/1976 | Satoh et al. ........................... 280/284 |
| 4,091,887 | * | 5/1978 | Kurata et al. ......................... 280/284 |
| 5,201,538 | * | 4/1993 | Mayn ................................. 280/288.1 |
| 5,474,318 | * | 12/1995 | Castellano ............................ 280/284 |
| 5,791,674 | * | 8/1998 | D'Alusio et al. ...................... 280/284 |

FOREIGN PATENT DOCUMENTS

| | | | |
|---|---|---|---|
| 1139540 | * | 7/1957 | (FR) ..................................... 280/284 |
| 1442105 | * | 7/1976 | (GB) .................................... 280/284 |
| 357837 | * | 7/1957 | (IT) ...................................... 280/281 |

* cited by examiner

*Primary Examiner*—Daniel G. DePumpo
(74) *Attorney, Agent, or Firm*—Varndell & Varndell, PLLC

(57) ABSTRACT

A shock-absorbing frame structure for bicycle includes a front frame unit formed of a head tube, a down tube, a seat tube, and a top tube, a bottom forks unit pivoted to the front frame unit, and a shock-absorbing device coupled between the front frame unit and the bottom forks unit, the seat tube having a seat pillar for holding a saddle and a top end for holding a seat back, the bottom forks unit including two bottom forks, and a connector connected between the bottom forks at a front side and pivoted to a bottom lug at the front frame unit, a cross tube connected between the bottom forks on the middle, an upward lug formed integral with the cross tube to support the shock-absorbing device, and an arched frame rod bridging the bottom forks at a rear end for the mounting of a luggage-carrier and a rear fender.

1 Claim, 4 Drawing Sheets

SHOCK-ABSORBING FRAME STRUCTURE FOR BICYCLE

BACKGROUND AND SUMMARY OF THE INVENTION

The present invention relates to a bicycle, and more particularly to a shock-absorbing frame structure for bicycle, which comprises a front frame unit, a bottom forks unit pivoted to the front frame unit, and a shock-absorbing device connected between the front frame unit and the bottom forks unit.

Nowadays, more and more people would like to use a bicycle as a personal transportation vehicle. Riding a bicycle neither consumes fuel nor causes pollution. Further, using a bicycle as one's personal transportation vehicle can simultaneously exercise the body. However, it is not comfortable to ride a bicycle over an uneven road surface. Because regular bicycles have not means to stop transmission of shocks from the wheels to the saddle. To an old person, the back may ache quickly when riding a bicycle.

According to one aspect of the present invention, the shock-absorbing frame structure for bicycle comprises a front frame unit formed of a head tube, a down tube, a seat tube, and a top tube, a bottom forks unit pivoted to the front frame unit, and a shock-absorbing device coupled between the front frame unit and the bottom forks unit. According to another aspect of the present invention, the seat tube has a seat pillar for holding a saddle, and a top end for holding a seat back. According to still another aspect of the present invention, quick-release locks are provided for locking the saddle and the seat back.

DETAILED DESCRIPTION OF THE PREFERRED EMBODIMENT

Figure 1:
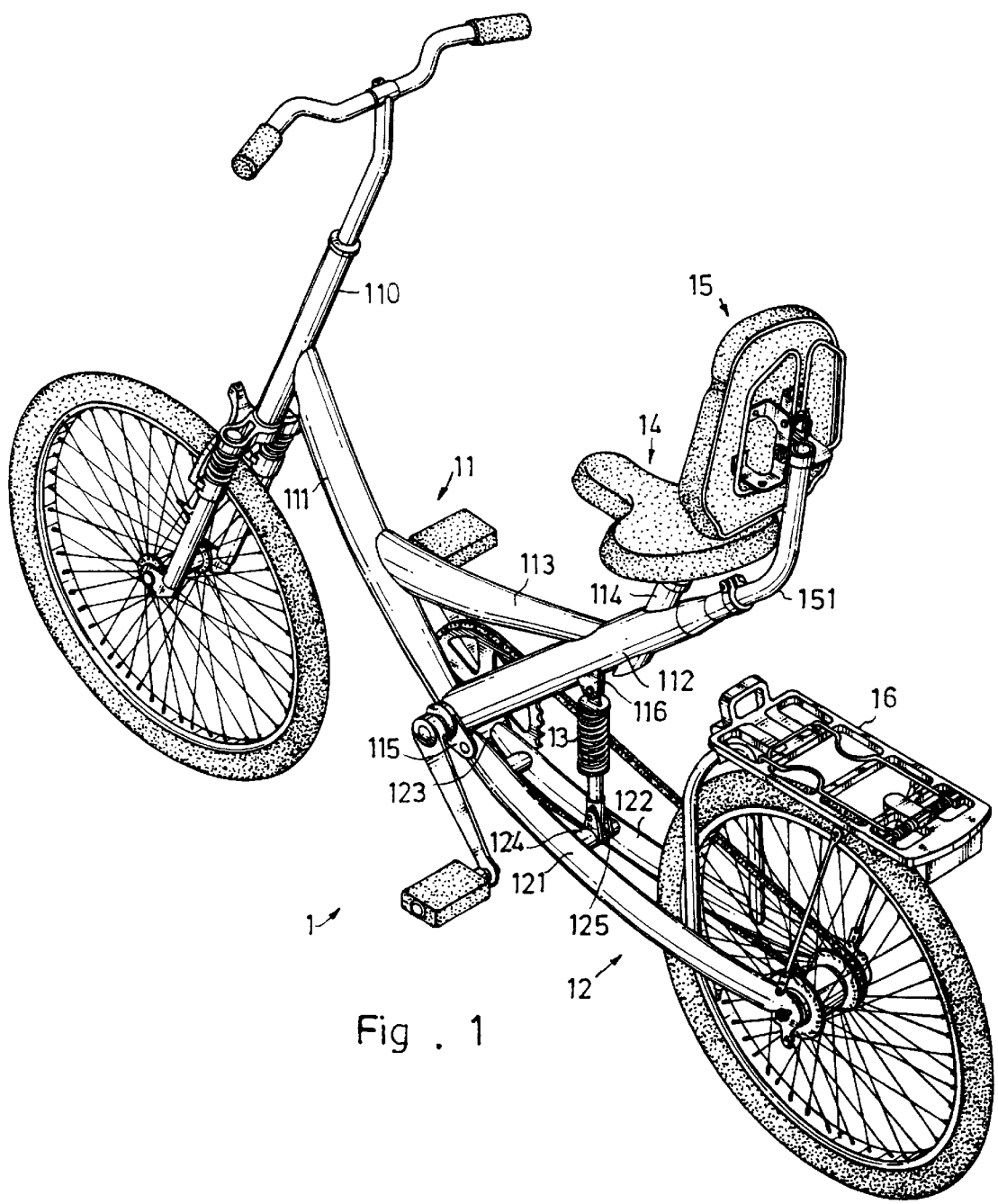
FIG. 1 is perspective view of a bicycle constructed according to the present invention.
Figure 2:
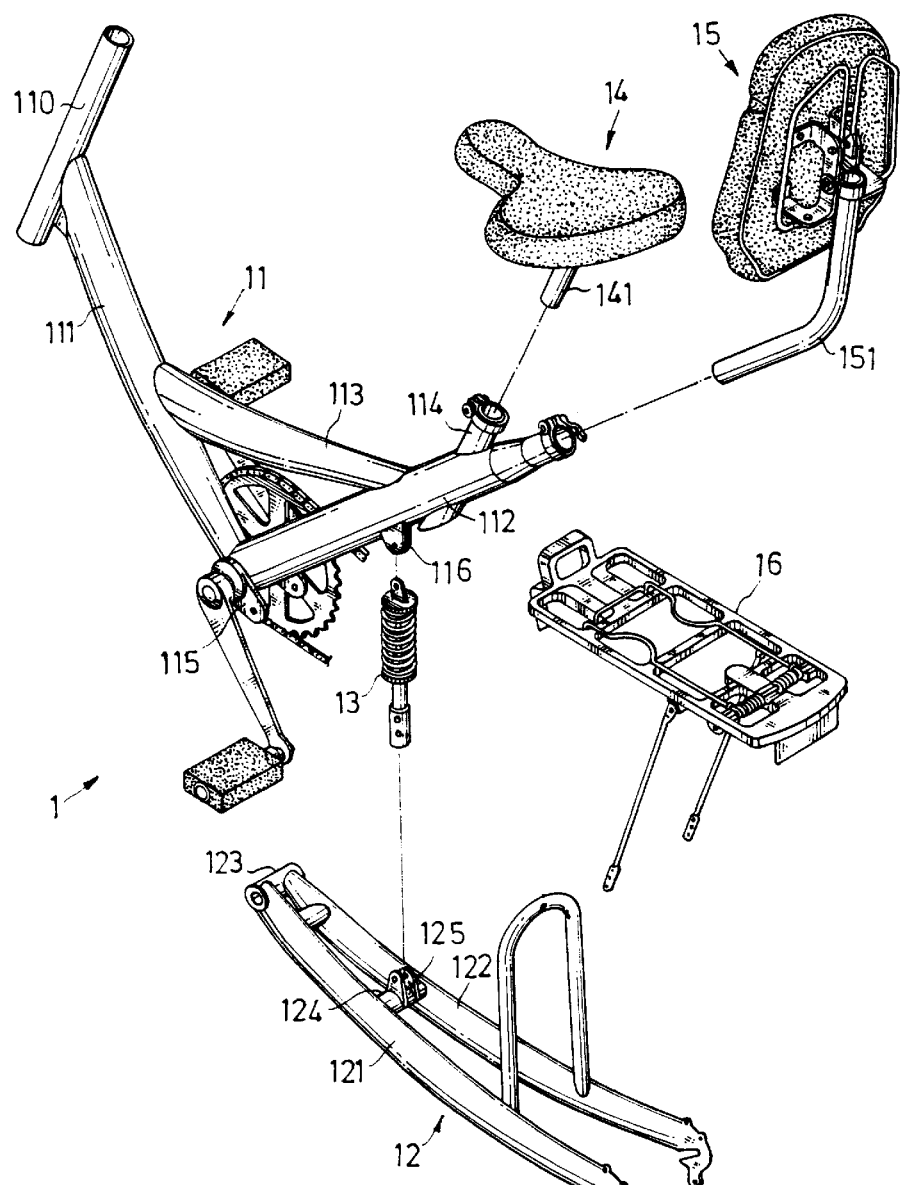
FIG. 2 is an exploded view of a shock-absorbing bicycle frame structure of the bicycle shown in FIG. 1.
Figure 3:
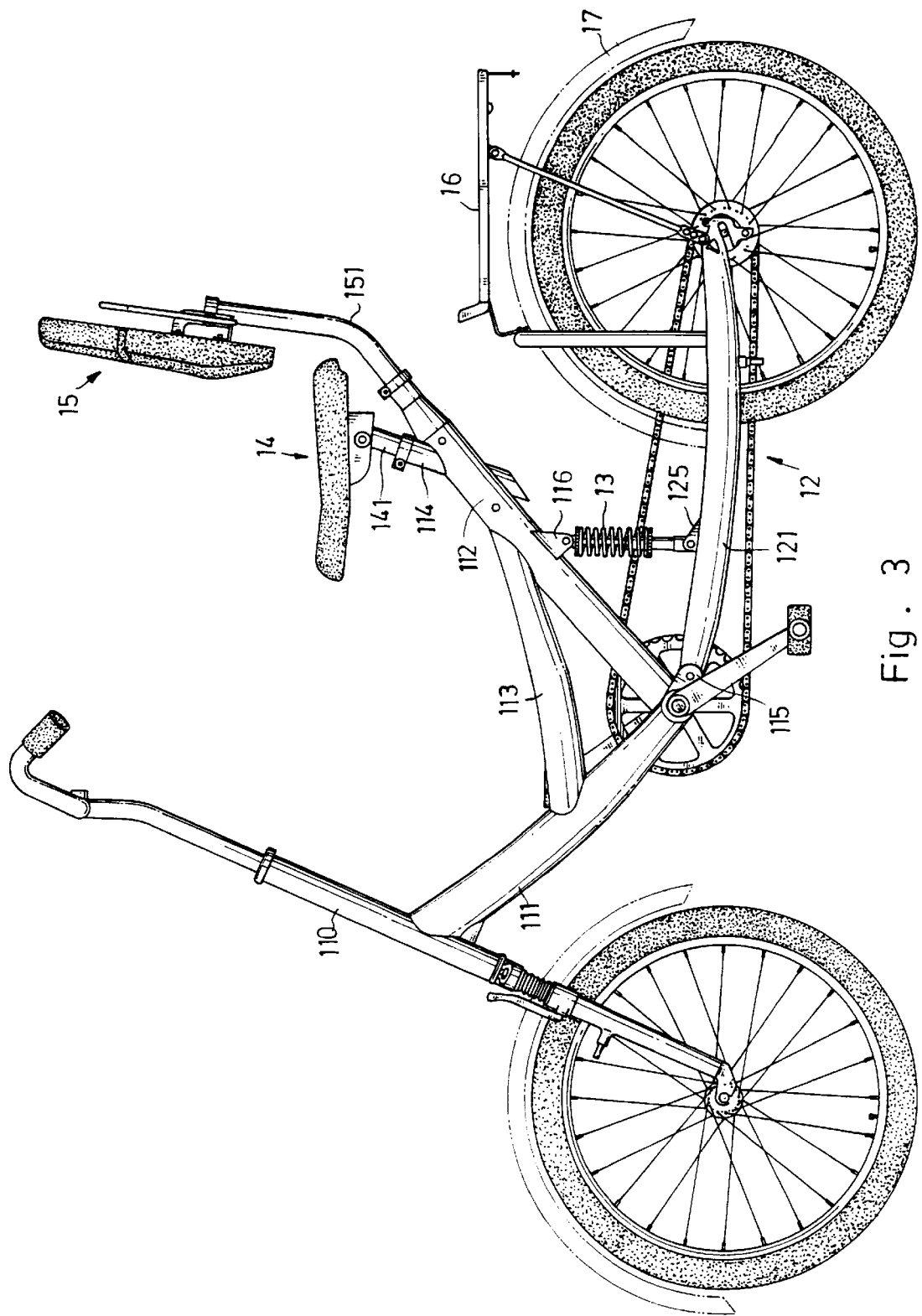
FIG. 3 is a side view of the bicycle shown in FIG. 1.
Figure 4:
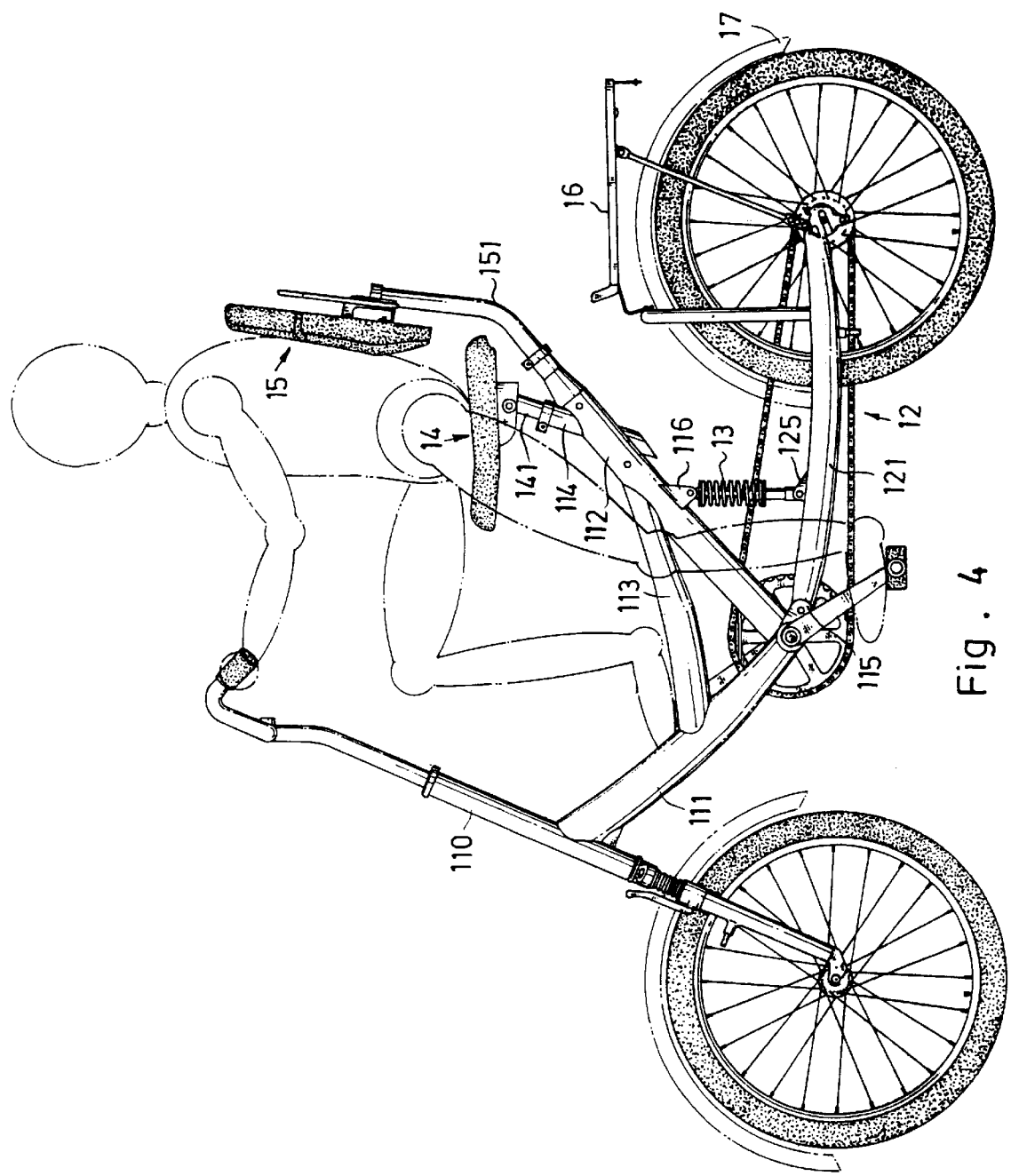
FIG. 4 is an applied view of the present invention.

Referring to Figures from 1 through 4, the bicycle frame 1, comprising a front frame unit 11, a bottom forks unit 12 pivoted to the front frame unit 11, and a shock-absorbing device 13 coupled between the front frame unit 11 and the bottom forks unit 12.

The front frame unit 11 comprises a head tube 110, a down tube 111, a seat tube 112, a top tube 113, and a seat Pillar 114. The seat tube 112 comprises a bottom lug 115 backwardly extended from the bottom bracket (at the connecting area between the down tube 111 and the seat tube 112 for holding a bearing axle and pedal cranks), and pivotablly connected to the bottom forks unit 12. The seat tube 112 and the down tube 111 for a V-shaped profile. The top tube 113 is connected between a middle part of the down tube 111 and a middle part of the seat tube 112. The down tube 111 has a front end connected to the head tube 110, and a rear end connected to the bottom end of the seat tube 112 (forming with the bottom end of the seat tube 112 a bottom bracket). The seat pillar 114 is disposed near the top end of the seat tube 112 for holding the stem of a saddle 14. A back seat 15 is provided having a curved stem 151 fastened to the top end of the seat tube 112. Lock screws (not shown) are respectively provided at the seat pillar 114 and the seat tube 112 to lock the saddle stem 141 of the saddle 14 and the curved stem 151 of the seat back 15. The seat tube 112 further comprises a back lug 116 on the middle, which holds the top end of the shock-absorbing device 13. The bottom forks unit 12 comprises two bottom forks 121 and 122, and a connector 123 connected between the bottom forks 121 and 122 at the front side and pivoted to the bottom lug 115 of the seat tube 112, a cross tube 124 connected between the bottom forks 121 and 122 on the middle, an upward lug 125 formed integral with the cross tube 124 and pivoted to the bottom end of the shock-absorbing device 13, and an arched frame rod 125 bridging the bottom forks 121 and 122 near the rear end for the mounting of a luggage-carrier 16 and a rear fender 17.

What is claimed is:

1. A shock-absorbing frame structure for bicycle comprising:

a front frame unit, said front frame unit comprising a head tube, a down tube having a front end connected to said head tube and a rear end, a seat tube having a bottom end connected to the rear end of said down tube and forming with the rear end of said down tube a bottom bracket and a top end holding a seat back, a top tube connected between a middle part of said down tube and a middle part of said seat tube, a bottom lug backwardly extended from said bottom bracket, a seat pillar disposed near the top end of said seat tube for holding the stem of a saddle, and a back lug formed integral with said seat tube on the middle at a back side;

a bottom forks unit pivoted to said front frame unit, said bottom forks unit comprising two bottom forks, and a connector connected between said bottom forks at a front side and pivoted to the bottom lug at the bottom bracket of said front frame unit, a cross tube connected between said bottom forks on the middle, an upward lug formed integral with said cross tube, and an arched frame rod bridging said bottom forks at a rear end for the mounting of a luggage-carrier and rear fender; and shock-absorbing means coupled between the upward lug of said bottom forks and the back lug at said seat tube.

* * * * *